July 23, 1929. E. KERN 1,722,097
APPARATUS FOR SELECTIVELY CUTTING OUT A RECTIFIER
WHEN FLASHING OVER OCCURS THEREIN
Filed Nov. 3, 1925
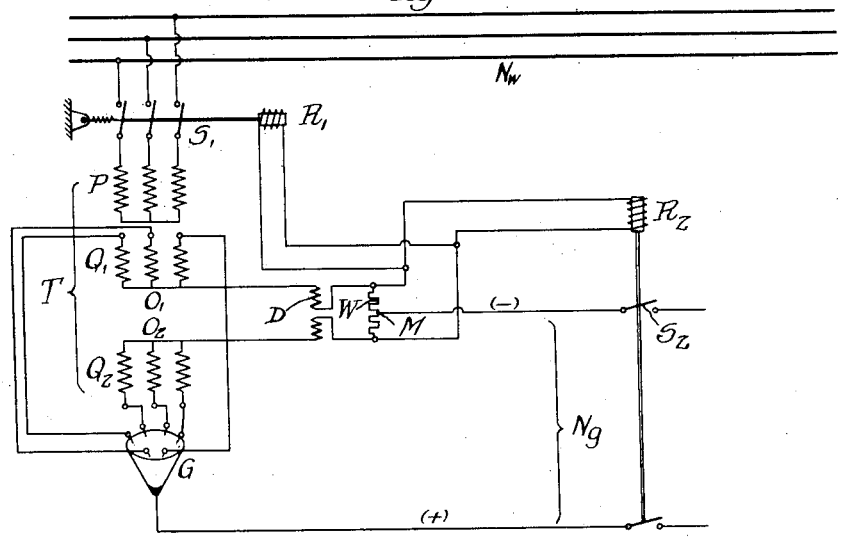
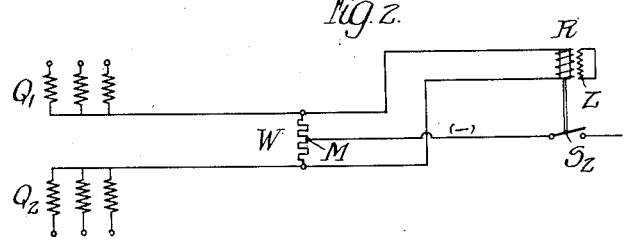
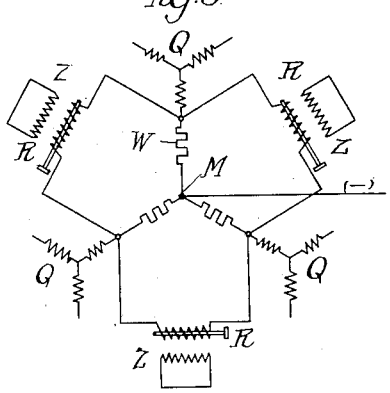
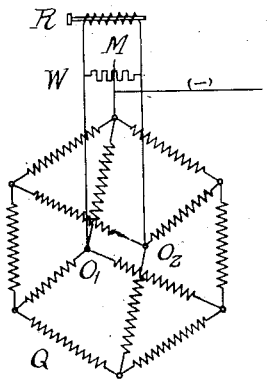
Witness:
R. Burkhardt.
Inventor:
Erwin Kern, Patented July 23, 1929.

1,722,097

UNITED STATES PATENT OFFICE.

ERWIN KERN, OF WETTINGEN, NEAR BADEN, SWITZERLAND, ASSIGNOR TO AKTIEN-GESELLSCHAFT BROWN BOVERI & CIE., OF BADEN, SWITZERLAND.

APPARATUS FOR SELECTIVELY CUTTING OUT A RECTIFIER WHEN FLASHING-OVER OCCURS THEREIN.

Application filed November 3, 1925, Serial No. 66,516, and in Germany August 31, 1925.

When a number of rectifiers are working in parallel it may become necessary to cut-out the entire group from the line if flashing-over occurs in one of them. In most cases this amounts to short-circuiting the line and the other rectifiers, and to prevent further damage it is usual to provide automatic cut-out devices which cut out the group as soon as the load current exceeds a certain maximum value. Such an interruption in working, however, is uneconomical and troublesome and should therefore be avoided if possible. In practice it would be sufficient to cut out only the rectifier in which the flashing-over has occurred, but for this purpose special devices are necessary.

Now the present invention utilizes for this purpose a phenomenon that can be observed in any rectifier when trouble occurs. Generally the rectifiers are connected symmetrically, that is to say, they are supplied with symmetrical polyphase current and the anodes are arranged in position and number symmetrically to the cathodes. In certain cases two symmetrical groups of windings and anodes are connected through a choking coil, otherwise known as an interphase transformer, to the middle of which (that is to say, also symmetrical to the groups) the direct current negative lead is connected. In normal working the current and potential are symmetrically distributed in the several parts. In the event of flashing-over or a short-circuit this symmetry is considerably upset, since even slight differences in the arrangement or the material of the apparatus will cause large differences in the distribution of potential and current when heavy loading occurs.

The present invention utilizes this unbalance or unsymmetry in the current or voltage conditions occurring in case of flash-over, or other abnormal operation, for selectively cutting out the faulty rectifier.

Forms of the invention will be described with reference to the accompanying drawings.

Fig. 1 shows an arrangement in which a six-phase secondary winding of a transformer feeding the rectifier is divided into two symmetrical three-phase systems of which the star points are connected through a choking coil.

Fig. 2 shows a similar arrangement but without a choking coil.

Fig. 3 shows an arrangement in which the secondary winding feeding the rectifier is arranged in multiple star-connection (the so-called "snowflake" connection), and Fig. 4 shows an arrangement in which the secondary winding is connected in mesh with windings connected to the corner points arranged in two star-connected groups.

Referring to Fig. 1, $N_w$ designates the line feeding the transformer T, of which P is the primary winding and $Q_1$ and $Q_2$ are the secondary windings; G is the rectifier, D the choking coil, $N_g$ the direct current leads and W an ohmic resistance. $R_1$ and $R_2$ are two relays for operating the switches $S_1$ and $S_2$ respectively. In the remaining figures for the sake of clearness the line $N_w$, the primary winding P, the rectifier G, the primary switch $S_1$ and the corresponding relay $R_1$ have been omitted.

The mode of operation of the device shown in Fig. 1 is as follows:—

When the rectifier is operating normally the potential between the outer terminals of the resistance W is approximately zero. It is true a current of the third harmonic flows between the two star points $O_1$ and $O_2$, but this current is small compared with the direct current flowing through the resistance, since it is checked by the choking coil D. The direct current flowing from the negative conductor of the direct current line $N_g$ through the tapping point M to the star point $O_1$ flows through only one half (the upper half) of the resistance W, whilst the direct current flowing from the negative conductor through M to the star point $O_2$, and which is of equal strength to that flowing to the star point $O_1$, flows through the other half (the lower half) of the resistance W, but in the opposite direction. The drop in potential across the halves of the resistance are therefore equal and opposite, so that when the rectifier is operating normally there is no difference of potential between the terminals of the resistance. But if owing to flashing-over or other abnormal condition, a disturbance of the symmetry occurs in the rectifier, for example a short circuit in the winding $Q_2$, the direct current flowing from M to $Q_2$ will be zero, so that at that instant direct current will flow only from M to $O_1$. A considerable difference of potential is thereby produced between the terminals of the resistance which can be utilized for the operation of the relays $R_1$ and $R_2$. The relay $R_2$ causes the switch $S_2$ to open and the rectifier to be disconnected from the direct current leads $N_g$. Similarly, the relay $R_1$ causes the switch $S_1$ to open and the rectifier to be disconnected from the line $N_w$. Thus the source of disturbance is selectively cut out without interrupting the working of other rectifiers.

The arrangement shown in Fig. 2 is similar to that of Fig. 1 with the exception that the choking coil is omitted. In this case a considerable potential due to the current of the third harmonic occurs at the terminals of the resistance W even when the rectifier is operating normally. In order to neutralize the effect of this potential the magnet of the relay is provided with a second coil Z which is short-circuited and thus prevents the occurrence of an alternating potential at the terminals of the resistance. To a certain extent the relay R short-circuits the resistance W for alternating currents since it allows alternating currents to pass through almost without resistance, but the alternating current ampere turns in the relay coil are compensated by the ampere turns of the coil Z. Otherwise the operation of the device is as described in connection with Fig. 1.

In Fig. 3 the secondary winding of the transformer consists of three star-connected three-phase groups of windings Q—Q—Q, connected in star through a star-connected resistance W from the star point of which the negative direct current conductor is taken. This type of winding is described in the copending application of J. Kubler, Serial No. 546,204, filed March 23, 1922. Relays R are connected to the outer terminals of the star-connected arms of the resistance, but as in the arrangement of Fig. 2 each relay is provided with a short-circuited winding Z to neutralize the effect of the alternating potential at the terminals of the resistance. If the direct currents flowing in the resistance from the star point to the terminals are equal to each other, no disturbance in working will occur since the difference of potential at the terminals of the resistance will be zero. But if on the other hand flashing-over occurs in the rectifier, a potential difference will occur between terminals of the resistance which will cause the isolating relays $R_1$ and $R_2$ to operate.

In the arrangement shown in Fig. 4 the secondary winding of the transformer feeding the rectifier is mesh-connected. The six corner points of the polygon are connected to six windings arranged as two star-connected phase-displaced groups. Such winding is described in the copending application of J. Kubler, Ser. No. 497,431, filed Aug. 31, 1921. The two star points $O_1$ and $O_2$ of these groups are connected through the resistance W, the middle M of which is the connecting point for the negative direct current conductor. When the rectifier is operating normally two direct currents flow through the resistance, one from M to $O_1$ and the other simultaneously from M to $O_2$. Owing to the symmetry of the arrangement these direct currents are equal and the potential differences produced in the two parts of the resistance are therefore equal and opposite. Normally, therefore, there is no difference of potential between the terminals of the resistance. Now it is a peculiarity of the mesh connection that no appreciable current of the third harmonic flows from $O_1$ to $O_2$, so that it is unnecessary to provide a short-circuited winding on the magnets of the relays. In the event of flashing-over or other disturbance however, a difference of potential will occur at the terminals of the resistance and will cause the relay to operate, thereby isolating the faulty rectifier from the line.

In the foregoing exemplifications of the invention, a plurality of star-connected rectifying elements are connected to polyphase windings, also arranged in star-connected polyphase groups, with a direct current line leading from the star terminals of the windings and the rectifier elements, respectively. Polyphase groups of star-connected rectifying paths are thus obtained and the control or auxiliary apparatus for cutting off the rectifier or for performing other operations is actuated in response to the differential action of the currents flowing in different rectifying paths of said phase groups.

In the preferred arrangement shown in the drawings, this is effected by joining the individual phase groups to a common star point through star-connected resistor elements, the control or auxiliary apparatus being connected between the end terminals of said resistor elements. Under normal operating conditions, when the currents in the several rectifying paths are balanced, the end points of said resistor elements will have substantially the same direct current potential and the control device will not be actuated. Upon occurrence of an unbalance in the current-flow conditions of the individual phases, as in the case of a flash-over, a differential current will flow between the end terminals of said resistor elements, actuating the control apparatus included in the circuit therebetween.

The invention is not restricted to the particular organizations and arrangements described hereinabove and it is desired that the appended claims be given a broad construction commensurate with the scope of the invention.

What I claim is:—

1. In a rectifier installation comprising an alternating-current line, a direct-current line, a rectifier interconnecting said lines, control apparatus associated therewith, said rectifier having a plurality of rectifying paths including a transformer winding and a serially-connected rectifying element; and means utilizing a differential action of the currents flowing in different rectifying paths for actuating said control apparatus.

2. In a rectifier installation, a plurality of star-connected rectifying paths, each path comprising a rectifying element and transformer windings, switching means for cutting out said rectifier, and control means for actuating said switching means, said control means being connected between equipotential points on different paths, said points being so located that abnormal rectifier operation creates a potential difference between said points.

3. In a rectifier installation, a plurality of rectifying paths, each path comprising a rectifying element and a transformer winding, said paths having a common terminal, switching means for cutting out said rectifier paths, said switching means being actuated by the differential action of currents flowing in different rectifying paths.

4. In a rectifier system, a polyphase transformer, a plurality of star-connected rectifying elements connected to the terminals of said transformer to constitute a plurality of rectifying paths, a direct-current line connected between the star point of said rectifier and the neutral point of said transformer, an electromagnetic control apparatus connected between auxiliary control terminals on different rectifying paths, said control terminals being so arranged that predetermined direct-current potential variations take place between the same in response to variations of the operating conditions of the rectifier, and means for eliminating the action of the alternating current potential variations between said control terminals on the action of said control apparatus.

5. In a rectifier system, a polyphase transformer having a plurality of star-connected phase windings, a plurality of rectifying elements connected in a star to the terminals of said windings, said windings constituting two phase groups symmetrically displaced with respect to each other, a direct current line connected between the star points of said rectifier elements and said windings, an electromagnetic control apparatus connected between a control terminal in the circuit of one group and a control terminal in the circuit of the other group, said control terminals having substantially the same potential under normal current-flow conditions in the phases of said rectifier and having a substantial potential difference upon unbalanced current-flow in said rectifier phases, and means for eliminating the effect of alternating current-flow between the said control terminals on said electromagnetic control apparatus.

6. In a rectifier system, a plurality of groups of polyphase transformer windings, a plurality of groups of star-connected rectifying elements for said winding groups, each winding group wtih the associated rectifying elements constituting a plurality of polyphase star-connected rectifying paths, a plurality of resistor elements connecting the star points of the individual groups to a common star point, and an electromagnetic control apparatus connected between the end terminals of said resistor elements.

7. In a rectifier system, a plurality of groups of polyphase transformer windings, a plurality of groups of star-connected rectifying elements for said winding groups, each winding group with the associated rectifying elements constituting a plurality of polyphase star-connected rectifying paths, a plurality of resistor elements connecting the star points of the individual groups to a common star point, and an electromagnetic control apparatus connected between the end terminals of said resistor elements, the phases of one group being displaced against the phases of another group.

8. In a rectifying system of the character described, current-rectifying apparatus, an alternating-current supply line therefor, a direct-current line, switch means operable to place said apparatus into and out of effective relationship with respect to said direct-current line, relay means for effecting opening operation of said switch means, and means responsive to abnormal current-flow conditions in said apparatus and being operable upon occurrence of such conditions to effect switch-opening action of said relay means and including winding means connected at substantially its ends to said relay means and connected in said direct-current line at a point intermediate said ends.

9. In a rectifying system of the character described, current-rectifying apparatus, an alternating-current supply line therefor, a direct-current line, switch means operable to place said apparatus into and out of effective relationship with respect to said direct-current line, relay means for effecting opening operation of said switch means, and means providing an operating connection between said apparatus and said direct-current line and being responsive to a differential current condition in said apparatus and being operable upon occurrence of such condition to effect switch-opening action of said relay means.

Dated this 15th day of October, 1925.

ERWIN KERN.